US012205612B2

(12) United States Patent
Daimo

(10) Patent No.: US 12,205,612 B2
(45) Date of Patent: Jan. 21, 2025

(54) ACTION IDENTIFICATION METHOD, ACTION IDENTIFICATION DEVICE, AND NON-TRANSITORY COMPUTER-READABLE RECORDING MEDIUM RECORDING ACTION IDENTIFICATION PROGRAM

(71) Applicant: Panasonic Intellectual Property Corporation of America, Torrance, CA (US)

(72) Inventor: Katsunori Daimo, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 131 days.

(21) Appl. No.: 17/887,942

(22) Filed: Aug. 15, 2022

(65) Prior Publication Data

US 2022/0392483 A1 Dec. 8, 2022

Related U.S. Application Data

(63) Continuation of application No. PCT/JP2020/041472, filed on Nov. 6, 2020.

(30) Foreign Application Priority Data

Mar. 6, 2020 (JP) ................................ 2020-039116

(51) Int. Cl.
*G10L 25/24* (2013.01)
*G10L 21/0232* (2013.01)
(Continued)

(52) U.S. Cl.
CPC .......... *G10L 25/51* (2013.01); *G10L 21/0232* (2013.01); *G10L 25/24* (2013.01);
(Continued)

(58) Field of Classification Search
CPC .................... G10L 25/51; G10L 20/24; G10L 2021/02082; G10L 2021/02163; H04R 29/00; H04R 29/004; H04R 29/005
(Continued)

(56) References Cited

U.S. PATENT DOCUMENTS 8,285,545 B2 * 10/2012 Lee ......................... G10L 15/20 704/226
9,837,102 B2 * 12/2017 Zad Issa ................. G10L 25/84
2016/0155452 A1 * 6/2016 Sharifi .................... G10L 19/06 381/56

FOREIGN PATENT DOCUMENTS

JP 4456504 4/2010
JP 2010-282239 12/2010

OTHER PUBLICATIONS

International Search Report issued in International Patent Application No. PCT/JP2020/041472, dated Dec. 15, 2020, along with an English translation thereof.

* cited by examiner

*Primary Examiner* — Disler Paul
(74) *Attorney, Agent, or Firm* — Greenblum & Bernstein, P.L.C.

(57) ABSTRACT

An action identification device acquires sound data from a microphone, calculates a feature amount of the sound data, determines whether or not a user is present in a space in which the microphone is installed, calculates a noise feature amount indicating a feature amount of noise based on the calculated feature amount and stores the calculated noise feature amount in a noise feature amount storage unit in a case where the user is not present in the space, subtracts the noise feature amount stored in the noise feature amount storage unit from the calculated feature amount to extract an action sound feature amount indicating a feature amount of
(Continued)

an action sound generated by an action of the user in a case where the user is present in the space, and identifies an action of the user by using the action sound feature amount.

8 Claims, 6 Drawing Sheets

(51) Int. Cl.
*G10L 25/51* (2013.01)
*H04R 29/00* (2006.01)
*G10L 21/0208* (2013.01)
*G10L 21/0216* (2013.01)

(52) U.S. Cl.
CPC .. *H04R 29/004* (2013.01); *G10L 2021/02082* (2013.01); *G10L 2021/02163* (2013.01)

(58) Field of Classification Search
USPC ................................ 381/56, 58, 91–92, 94.7
See application file for complete search history.

FIG.4

| LOCATION | ACTION SOUND | NOISE | CONSECUTIVE FRAME NUMBER | NOISE SUPPRESSION METHOD |
|---|---|---|---|---|
| BATHROOM<br>WASHROOM | SHOWER SOUND<br>TOOTH BRUSHING SOUND<br>HAND WASHING SOUND<br>DRYER SOUND | VENTILATION FAN SOUND | FIRST CONSECUTIVE FRAME NUMBER (2.0 sec) | FIRST NOISE SUPPRESSION METHOD<br>[WHEN USER IS ABSENT]<br>CALCULATE AND STORE AVERAGE CEPSTRUM OF FIRST OR SECOND NUMBER OF CONSECUTIVE FRAMES<br>[WHEN USER IS PRESENT IN ROOM]<br>SUBTRACT STORED AVERAGE CEPSTRUM FROM CEPSTRUM OF CURRENT FRAME |
| KITCHEN | HAND WASHING SOUND | VENTILATION FAN SOUND | | |
| BEDROOM | DOOR OPENING /CLOSING SOUND | OUTDOOR NOISE<br>SOUND OF TELEVISION | SECOND CONSECUTIVE FRAME NUMBER (200 msec) | |
| CORRIDOR | WALKING SOUND<br>DOOR OPENING /CLOSING SOUND | ECHOING SOUND | SECOND CONSECUTIVE FRAME NUMBER (200 msec) | SECOND NOISE SUPPRESSION METHOD<br>CALCULATE AVERAGE CEPSTRUM OF SECOND NUMBER OF CONSECUTIVE FRAMES PRECEDING CURRENT FRAME AND SUBTRACT AVERAGE CEPSTRUM FROM CURRENT FRAME |

ACTION IDENTIFICATION METHOD, ACTION IDENTIFICATION DEVICE, AND NON-TRANSITORY COMPUTER-READABLE RECORDING MEDIUM RECORDING ACTION IDENTIFICATION PROGRAM

TECHNICAL FIELD

The present disclosure relates to an action identification method, an action identification device, and an action identification program for identifying a user's action.

BACKGROUND ART

In recent years, watching service, home appliance control service, and information presentation service on the basis of an action of a person in a housing space have been studied. On this occasion, from the viewpoint of privacy protection, a technique has been developed of estimating an action of a person not by an image obtained by capturing the person but by an action sound generated by the action of the person.

In order to estimate an action of a person by an action sound made by the person, it is necessary to identify the action sound made by the person. However, in a housing space, various noises are generated in addition to an action sound. When noise is mixed into an action sound, an SN ratio may decrease, and action identification accuracy might decrease.

Therefore, for example, Patent Literature 1 discloses a technique for reducing noise. The noise reduction device of Patent Literature 1 calculates a plurality of feature amounts for a voice noise mixed signal, analyzes information on voice and noise using the plurality of feature amounts and an input voice noise mixed signal, calculates a reduction variable corresponding to a plurality of noise reduction processing using the analyzed information and the input voice noise mixed signal, and reduces noise of the input voice noise mixed signal by the plurality of noise reduction processing using the calculated reduction variable.

However, in the above-described conventional technique, since an action sound as an identification target might also be reduced, it is difficult to accurately identify the action, and further improvement is required.

CITATION LIST

Patent Literature

Patent Literature 1: Japanese Patent No. 4456504

SUMMARY OF INVENTION

The present disclosure has been made to solve the above problem, and an object thereof is to provide a technique enabling a user's action to be identified with higher accuracy.

An action identification method according to one aspect of the present disclosure is an action identification method for identifying an action of a user, the method including steps of a computer of: acquiring sound data from a microphone; calculating a feature amount of the sound data; determining whether or not the user is present in a space in which the microphone is installed; calculating a noise feature amount indicating a feature amount of noise based on the calculated feature amount and storing the calculated noise feature amount in a storage unit in a case where the user is not present in the space; subtracting the noise feature amount stored in the storage unit from the calculated feature amount to extract an action sound feature amount indicating a feature amount of an action sound generated by an action of the user in a case where the user is present in the space; and identifying an action of the user by using the action sound feature amount.

According to the present disclosure, it is possible to identify a user's action with higher accuracy.

BRIEF DESCRIPTION OF DRAWINGS

FIG. 4 is a diagram for explaining a noise suppression method in the present embodiment.

Figure 1:
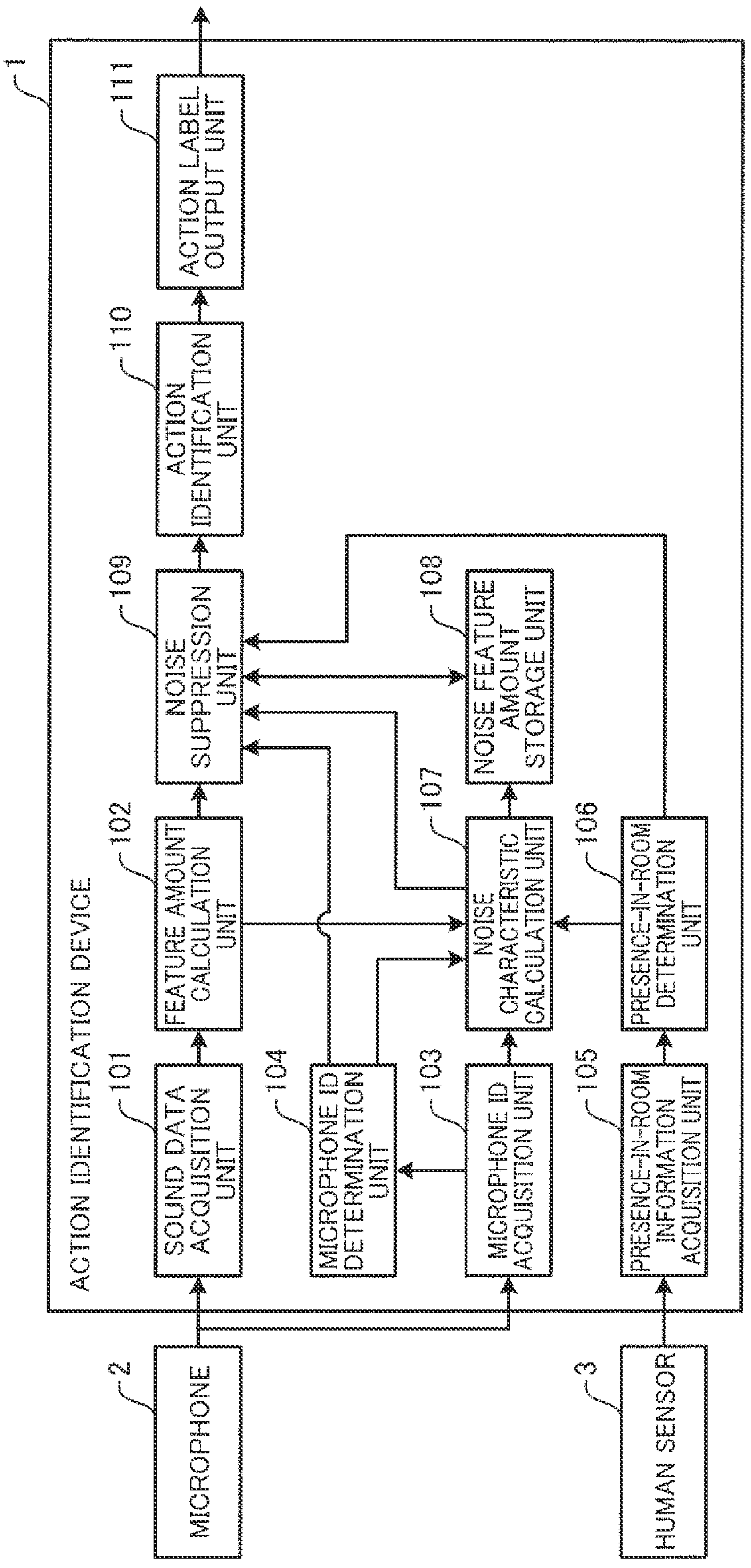
FIG. 1 is a diagram illustrating an example of a configuration of an action identification system according to an embodiment of the present disclosure.

DESCRIPTION OF EMBODIMENT (Knowledge Underlying the Present Disclosure)

In the above-described conventional technique, noise is reduced from a voice noise mixed signal in which voice uttered by a person and noise are mixed. However, in the above-described conventional technique, in a case where noise is reduced from a signal in which a non-voice action sound and noise are mixed, the action sound as an identification target might also be reduced, and it is therefore difficult to accurately identify the action.

In order to solve the above problem, an action identification method according to one aspect of the present disclosure is an action identification method for identifying an action of a user, the method including, by a computer: acquiring sound data from a microphone; calculating a feature amount of the sound data; determining whether or not the user is present in a space in which the microphone is installed; calculating a noise feature amount indicating a feature amount of noise based on the calculated feature amount and storing the calculated noise feature amount in a storage unit in a case where the user is not present in the space; subtracting the noise feature amount stored in the storage unit from the calculated feature amount to extract an action sound feature amount indicating a feature amount of an action sound generated by an action of the user in a case where the user is present in the space; and identifying an action of the user by using the action sound feature amount.

In a space where no user is present, only noise other than an action sound generated by an action of a user is detected. Therefore, in a case where no user is present in a space, a noise feature amount indicating a feature amount of noise is calculated based on a feature amount of sound data acquired from the microphone disposed in the space, and the calculated noise feature amount is stored in the storage unit. Then, in a case where the user is present in the space, the noise feature amount stored in the storage unit is subtracted from the feature amount of the sound data acquired from the microphone disposed in the space. As a result, it is possible to extract only the action sound feature amount indicating the feature amount of the action sound with noise suppressed in the space. Then, since the user's action is identified using the feature amount of the action sound with noise suppressed, the user's action can be identified with higher accuracy even in a space where the action sound and noise are mixed.

Furthermore, in the case where no user is present in the space, the noise feature amount indicating a feature amount of noise is stored in the storage unit. Therefore, in the case where a user is present in the space, an action sound of the user can be acquired in real time using the noise feature amount stored in the storage unit. As a result, the user's action can be identified in real time.

In addition, the action identification method described above may further include: acquiring identification information for identifying the microphone; in the calculation of the feature amount, dividing the sound data into frames on a fixed section basis and calculating the feature amount for each frame; and in the storage of the noise feature amount, determining the number of the frames based on the identification information and calculating an average of the feature amounts of a plurality of frames in the determined number as the noise feature amount.

It can be said that an action sound and noise depend on a space in which a microphone is installed. Therefore, by determining the number of frames based on the identification information for identifying the microphone, a noise feature amount can be calculated from noise having an optimal length according to a type of noise generated in the space where the microphone is installed.

In the action identification method described above, the number of the frames determined based on the identification information of the microphone installed in a space where stationary noise with a small time variation exists as the noise may be larger than the number of the frames determined based on the identification information of the microphone installed in a space where nonstationary noise with a large time variation exists as the noise.

According to this configuration, in a case where a stationary noise with a small time variation exists as noise, a noise feature amount can be calculated with higher accuracy by using a relatively long-time noise. In addition, in a case where nonstationary noise with a large time variation exists as noise, a long-time noise is unnecessary, and a noise feature amount can be calculated with higher accuracy by using a relatively short-time noise.

In addition, the action identification method described above may further include: acquiring identification information for identifying the microphone; in the calculation of the feature amount, dividing the sound data into frames on a fixed section basis and calculating the feature amount for each frame; in a case where the identification information is predetermined identification information, calculating an average of feature amounts of a plurality of frames preceding a current frame as the noise feature amount; and subtracting the calculated noise feature amount from the calculated feature amount of the current frame to extract the action sound feature amount.

For example, an echoing sound generated by echoing of a person's walking sound on a surrounding wall can be suppressed in real time by using sound data of the latest frame. Therefore, in a case where acquired identification information is identification information of the microphone installed in a space where an echoing sound is generated, it is possible to suppress noise in real time by subtracting an average of feature amounts of a plurality of frames preceding a current frame from a feature amount of the current frame.

In addition, in the action identification method described above, the predetermined identification information may be the identification information of the microphone installed in a space where an echoing sound exists as the noise. According to this configuration, an echoing sound can be suppressed in real time.

In the action identification method described above, the feature amount may be a cepstrum. According to this configuration, a user's action can be identified using a cepstrum of an action sound with noise suppressed.

An action identification device according to another aspect of the present disclosure is an action identification device that identifies an action of a user, the action identification device including: a sound data acquisition unit that acquires sound data from a microphone; a feature amount calculation unit that calculates a feature amount of the sound data; a determination unit that determines whether or not the user is present in a space in which the microphone is installed; a noise calculation unit that calculates a noise feature amount indicating a feature amount of noise based on the calculated feature amount, and stores the calculated noise feature amount in a storage unit in a case where the user is not present in the space; an action sound extraction unit that subtracts the noise feature amount stored in the storage unit from the calculated feature amount to extract an action sound feature amount indicating a feature amount of an action sound generated by an action of the user in a case where the user is present in the space; and an action identification unit that identifies the action of the user by using the action sound feature amount.

In a space where no user is present, only noise other than an action sound generated by an action of a user is detected. Therefore, in a case where no user is present in a space, a noise feature amount indicating a feature amount of noise is calculated based on a feature amount of sound data acquired from the microphone disposed in the space, and the calculated noise feature amount is stored in the storage unit. Then, in a case where the user is present in the space, the noise feature amount stored in the storage unit is subtracted from the feature amount of the sound data acquired from the microphone disposed in the space. As a result, it is possible to extract only the action sound feature amount indicating the feature amount of the action sound with noise suppressed in the space. Then, since the user's action is identified using the feature amount of the action sound with noise suppressed, the user's action can be identified with higher accuracy even in a space where the action sound and noise are mixed.

Furthermore, in the case where no user is present in the space, the noise feature amount indicating a feature amount of noise is stored in the storage unit. Therefore, in the case where a user is present in the space, an action sound of the user can be acquired in real time using the noise feature amount stored in the storage unit. As a result, the user's action can be identified in real time.

A non-transitory computer-readable recording medium recording an action identification program according to still another aspect of the present disclosure is an action identification program for identifying an action of a user, the action identification program causing a computer to function so as to: acquire sound data from a microphone; calculate a feature amount of the sound data; determine whether or not the user is present in a space in which the microphone is installed; calculate a noise feature amount indicating a feature amount of noise based on the calculated feature amount and store the calculated noise feature amount in a storage unit in a case where the user is not present in the space; subtract the noise feature amount stored in the storage unit from the calculated feature amount to extract an action sound feature amount indicating a feature amount of an action sound generated by an action of the user in a case where the user is present in the space; and identify the action of the user by using the action sound feature amount.

In a space where no user is present, only noise other than an action sound generated by an action of a user is detected. Therefore, in a case where no user is present in a space, a noise feature amount indicating a feature amount of noise is calculated based on a feature amount of sound data acquired from the microphone disposed in the space, and the calculated noise feature amount is stored in the storage unit. Then, in a case where the user is present in the space, the noise feature amount stored in the storage unit is subtracted from the feature amount of the sound data acquired from the microphone disposed in the space. As a result, it is possible to extract only the action sound feature amount indicating the feature amount of the action sound with noise suppressed in the space. Then, since the user's action is identified using the feature amount of the action sound with noise suppressed, the user's action can be identified with higher accuracy even in a space where the action sound and noise are mixed.

Furthermore, in the case where no user is present in the space, the noise feature amount indicating a feature amount of noise is stored in the storage unit. Therefore, in the case where a user is present in the space, an action sound of the user can be acquired in real time using the noise feature amount stored in the storage unit. As a result, the user's action can be identified in real time.

In the following, an embodiment of the present disclosure will be described with reference to the accompanying drawings. Note that the following embodiment is an example embodying the present disclosure and does not limit a technical scope of the present disclosure.

Embodiment

FIG. 1 is a diagram illustrating an example of a configuration of an action identification system according to an embodiment of the present disclosure. The action identification system illustrated in FIG. 1 includes an action identification device 1, a microphone 2, and a human sensor 3.

The microphone 2 collects surrounding sound. The microphone 2 outputs data of the collected sound and a microphone ID for identifying the microphone 2 to the action identification device 1.

The human sensor 3 detects a user present in the surroundings. The human sensor 3 outputs presence-in-room information indicating whether a user has been detected or not and a sensor ID for identifying the human sensor 3 to the action identification device 1.

The action identification system is installed in a residence where a user lives. The microphone 2 and the human sensor 3 are disposed in each room in the residence.

Figure 2:
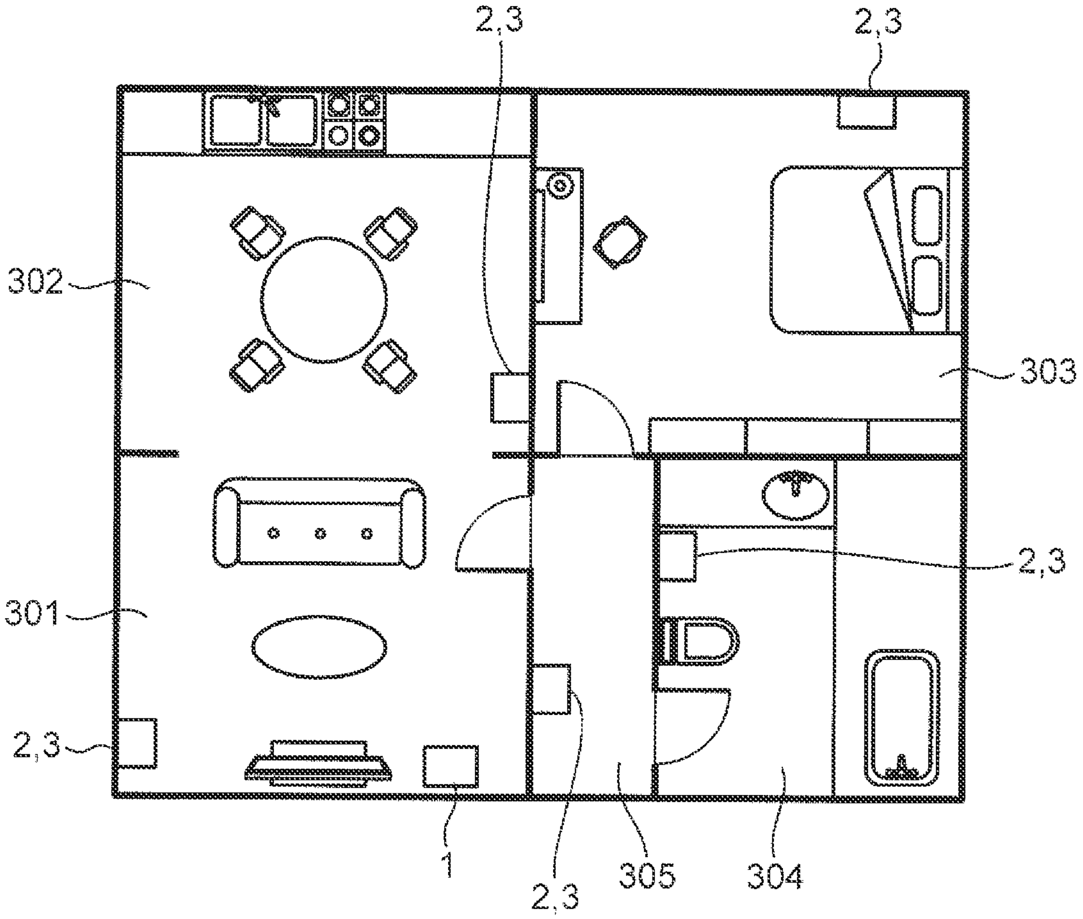
FIG. 2 is a diagram for explaining an arrangement of an action identification device, a microphone, and a human sensor according to the embodiment of the present disclosure.

FIG. 2 is a diagram for explaining an arrangement of the action identification device, the microphone, and the human sensor according to the embodiment of the present disclosure.

The microphone 2 and the human sensor 3 are disposed in, for example, each of a living room 301, a kitchen 302, a bedroom 303, a bathroom 304, and a corridor 305. The microphone 2 and the human sensor 3 may be provided in one casing, or may be provided in casings different from each other. In addition, there is presented a home appliance having a microphone built therein, such as a smart speaker. In addition, there is presented a home appliance having a human sensor built therein, such as an air conditioner. Therefore, the microphone 2 and the human sensor 3 may be built in a home appliance.

The action identification device 1 identifies an action of a user. The action identification device 1 is installed in a residence where a user lives. The action identification device 1 is disposed in a predetermined room in the residence. The action identification device 1 is disposed in, for example, the living room 301. Note that the room in which the action identification device 1 is disposed is not particularly limited. The action identification device 1 is connected to each of the microphone 2 and the human sensor 3 by, for example, a wireless local area network (LAN).

The action identification device 1 includes a sound data acquisition unit 101, a feature amount calculation unit 102, a microphone ID acquisition unit 103, a microphone ID determination unit 104, a presence-in-room information acquisition unit 105, a presence-in-room determination unit 106, a noise characteristic calculation unit 107, a noise feature amount storage unit 108, a noise suppression unit 109, an action identification unit 110, and an action label output unit 111.

The sound data acquisition unit 101, the feature amount calculation unit 102, the microphone ID acquisition unit 103, the microphone ID determination unit 104, the presence-in-room information acquisition unit 105, the presence-in-room determination unit 106, the noise characteristic calculation unit 107, the noise suppression unit 109, the action identification unit 110, and the action label output unit 111 are implemented by a processor. The processor is configured with, for example, a central processing unit (CPU).

The noise feature amount storage unit 108 is realized by a memory. The memory is configured with, for example, a read only memory (ROM), an electrically erasable programmable read only memory (EEPROM), or the like.

The sound data acquisition unit 101 acquires sound data from the microphone 2. The sound data acquisition unit 101 receives the sound data transmitted by the microphone 2.

The feature amount calculation unit 102 calculates a feature amount of sound data. The feature amount calculation unit 102 divides the sound data into frames on a fixed section basis and calculates a feature amount for each frame. The feature amount in the present embodiment is a cepstrum. The cepstrum is obtained by logarithmically expressing spectrum information obtained by performing Fourier transform on sound data, and further performing Fourier transform on the logarithmically expressed information. The feature amount calculation unit 102 outputs the calculated feature amount to the noise characteristic calculation unit 107 and the noise suppression unit 109.

The microphone ID acquisition unit 103 acquires a microphone ID (identification information) for identifying the microphone 2. The microphone ID acquisition unit 103 receives the microphone ID transmitted by the microphone 2. The microphone ID is transmitted together with sound data. With the microphone ID, it is possible to specify in which room the sound data has been collected. The microphone ID acquisition unit 103 outputs the acquired microphone ID to the microphone ID determination unit 104 and the noise characteristic calculation unit 107.

The microphone ID determination unit 104 determines whether the microphone 2 corresponding to the microphone ID acquired by the microphone ID acquisition unit 103 is disposed in a first room in which noise is suppressed by a first noise suppression method or in a second room in which noise is suppressed by a second noise suppression method different from the first noise suppression method. The memory (not illustrated) stores in advance a table in which a microphone ID is associated with a room in which the microphone 2 corresponding to the microphone ID is disposed.

In the first noise suppression method, an average of feature amounts of a predetermined number of frames is calculated when the user is absent, the calculated average feature amount is stored in the noise feature amount storage unit 108 as a noise feature amount, and the noise feature amount stored in the noise feature amount storage unit 108 is subtracted from a feature amount of a current frame when the user is present in the room. In the second noise suppression method, an average of feature amounts of a plurality of frames preceding the current frame is calculated as a noise feature amount, and the calculated noise feature amount is subtracted from the calculated feature amount of the current frame.

The second room is a room (space) in which an echoing sound exists as noise, for example, a corridor. The first room is a room (space) in which noise other than an echoing sound exists, and is, for example, a bathroom, a washroom, a toilet, a kitchen, a bedroom, or a living room.

The microphone ID determination unit 104 outputs a determination result as to whether the microphone 2 corresponding to the microphone ID acquired by the microphone ID acquisition unit 103 is disposed in the first room or the second room to the noise characteristic calculation unit 107 and the noise suppression unit 109.

The presence-in-room information acquisition unit 105 acquires, from the human sensor 3, presence-in-room information indicating whether or not a user is present in a room (space) in which the microphone 2 is installed. The presence-in-room information acquisition unit 105 receives presence-in-room information transmitted by the human sensor 3.

The presence-in-room information acquisition unit 105 acquires, from the human sensor 3, a sensor ID for identifying the human sensor 3 together with the presence-in-room information. The memory (not illustrated) stores in advance a table in which a sensor ID is associated with a room in which the human sensor 3 corresponding to the sensor ID is disposed. The presence-in-room information acquisition unit 105 is capable of specifying which room's presence-in-room information is the acquired presence-in-room information by referring to the table.

The presence-in-room determination unit 106 determines whether or not a user is present in a room (space) in which the microphone 2 is installed. The presence-in-room determination unit 106 determines, based on the presence-in-room information acquired by the presence-in-room information acquisition unit 105, whether or not a user is present in a room in which the microphone 2 that has collected sound data is installed. The presence-in-room determination unit 106 outputs, to the noise characteristic calculation unit 107 and the noise suppression unit 109, a determination result as to whether or not the user is present in the room in which the microphone 2 is installed.

In a case where no user is present in the space, the noise characteristic calculation unit 107 calculates a noise feature amount indicating a feature amount of noise based on a calculated feature amount and stores the calculated noise feature amount in the noise feature amount storage unit 108. In a case where the presence-in-room determination unit 106 determines that no user is present in the room, the noise characteristic calculation unit 107 calculates a noise feature amount based on the calculated feature amount.

The noise feature amount storage unit 108 stores the noise feature amount calculated by the noise characteristic calculation unit 107. Note that the noise feature amount storage unit 108 stores the noise feature amount in association with the microphone ID.

Figure 3:
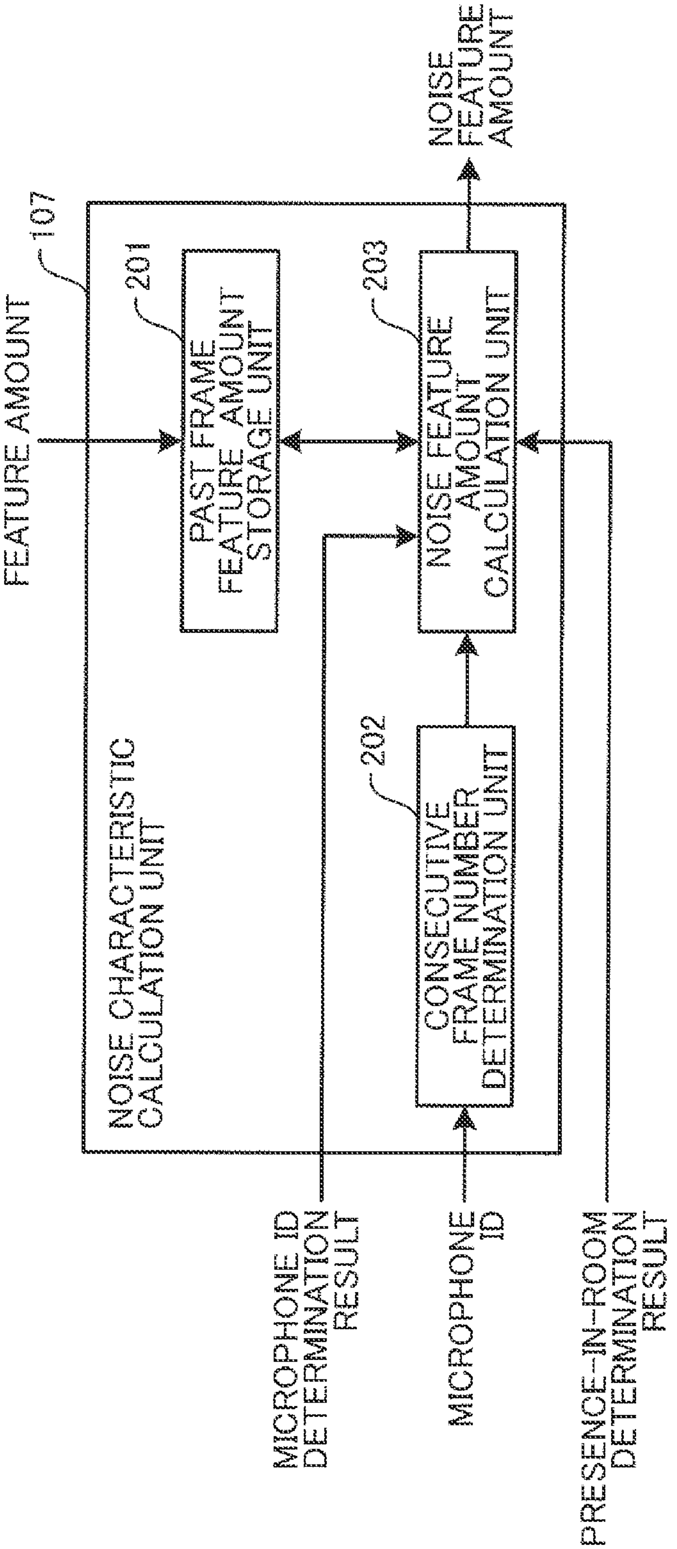
FIG. 3 is a diagram illustrating a configuration of a noise characteristic calculation unit illustrated in FIG. 1.

FIG. 3 is a diagram illustrating a configuration of the noise characteristic calculation unit illustrated in FIG. 1.

The noise characteristic calculation unit 107 includes a past frame feature amount storage unit 201, a consecutive frame number determination unit 202, and a noise feature amount calculation unit 203.

The past frame feature amount storage unit 201 stores a feature amount of each past frame calculated by the feature amount calculation unit 102. The feature amount calculation unit 102 stores the calculated feature amount for each frame in the past frame feature amount storage unit 201.

The consecutive frame number determination unit 202 determines the number of frames based on the microphone ID (identification information). At the time of calculating a noise feature amount, feature amounts of a plurality of consecutive frames are used. The number of consecutive frames varies depending on a type of noise. The number of frames determined based on the microphone ID (identification information) of the microphone 2 installed in a space where stationary noise with a small time variation exists as noise is larger than the number of frames determined based on the microphone ID (identification information) of the microphone 2 installed in a space where nonstationary noise with a large time variation exists as noise.

Examples of stationary noise include a sound of a ventilation fan. The sound of a ventilation fan is noise mainly in a kitchen, a bathroom, a washroom, and a toilet. Examples of nonstationary noise include outdoor noise, television sound, and echoing sound. The outdoor noise and the television sound are noises mainly in a living room and a bedroom. The echoing sound is noise mainly in a corridor.

Therefore, in a case where the microphone ID of the microphone 2 installed in the kitchen, the bathroom, the washroom, or the toilet is acquired, the consecutive frame number determination unit 202 determines a first consecutive frame number. The first consecutive frame number is, for example, 100. Since one frame has a length of, for example, 20 msec, the first consecutive frame number has a length of 2.0 sec. Furthermore, in a case where the microphone ID of the microphone 2 installed in the living room, the bedroom, or the corridor is acquired, the consecutive frame number determination unit 202 determines a second consecutive frame number less than the first consecutive frame number. The second consecutive frame number is, for example, 10. Since one frame has a length of, for example, 20 msec, the second consecutive frame number has a length of 200 msec. Note that the length of one frame, the length of frames in the first consecutive frame number, and the length of frames in the second consecutive frame number are not limited to those described above.

Furthermore, although in the present embodiment, the number of frames is determined in advance for the microphone ID or the room, the number of frames may be changed according to a type of noise.

In a case where no user is present in the room (space) in which the microphone 2 is installed, the noise feature amount calculation unit 203 calculates, as a noise feature amount, an average of feature amounts of the plurality of frames in the number determined by the consecutive frame number determination unit 202.

Here, in a case where the microphone ID determination unit 104 determines that the room in which the microphone 2 that has collected the sound data is installed is the first room, the presence-in-room determination unit 106 determines that the user is not present in the room in which the microphone 2 that has collected the sound data is installed, and the consecutive frame number determination unit 202 determines that the number of consecutive frames is the first consecutive frame number, the noise feature amount calculation unit 203 calculates an average of the feature amounts of the respective frames in the first consecutive frame number as a noise feature amount. At this time, the noise feature amount calculation unit 203 reads the feature amount of each of the frames in the first consecutive frame number from the past frame feature amount storage unit 201, and calculates an average of the feature amounts of the respective frames in the first consecutive frame number as a noise feature amount.

In addition, in a case where the microphone ID determination unit 104 determines that the room in which the microphone 2 that has collected the sound data is installed is the first room, the presence-in-room determination unit 106 determines that the user is not present in the room in which the microphone 2 that has collected the sound data is installed, and the consecutive frame number determination unit 202 determines that the number of consecutive frames is the second consecutive frame number, the noise feature amount calculation unit 203 calculates an average of the feature amounts of the respective frames in the second consecutive frame number as a noise feature amount. At this time, the noise feature amount calculation unit 203 reads the feature amount of each of the frames in the second consecutive frame number from the past frame feature amount storage unit 201, and calculates an average of the feature amounts of the respective frames in the second consecutive frame number as a noise feature amount.

Furthermore, in a case where the microphone ID (identification information) is a predetermined microphone ID (identification information), the noise feature amount calculation unit 203 calculates, as a noise feature amount, an average of feature amounts of a plurality of frames preceding the current frame. The predetermined microphone ID (identification information) is a microphone ID (identification information) of the microphone 2 installed in a room (space) where an echoing sound exists as noise. Specifically, in a case where the microphone ID determination unit 104 determines that the room in which the microphone 2 that has collected the sound data is installed is the second room, and the consecutive frame number determination unit 202 determines that the number of consecutive frames is the second consecutive frame number, the noise feature amount calculation unit 203 calculates, as a noise feature amount, an average of the feature amounts of the respective frames in the second consecutive frame number preceding the current frame. At this time, the noise feature amount calculation unit 203 reads feature amounts of the respective frames, starting from a frame one before the current frame, in the second consecutive frame number from the past frame feature amount storage unit 201, and calculates an average of the feature amounts of the respective frames in the second consecutive frame number as a noise feature amount.

Note that an echoing sound of a walking sound of a user is generated when the user is present in the room. This echoing sound needs to be suppressed in real time from acquired sound data. Therefore, in a case where the room in which the microphone 2 that has collected the sound data is installed is the second room, the noise feature amount calculation unit 203 calculates, as a noise feature amount, an average of the feature amounts of the plurality of frames preceding the current frame regardless of whether or not the user is present in the second room.

Note that, in a case where the microphone ID determination unit 104 determines that the room in which the microphone 2 that has collected the sound data is installed is the second room, and the presence-in-room determination unit 106 determines that the user is present in the room in which the microphone 2 that has collected the sound data is installed, the noise feature amount calculation unit 203 may calculate, as a noise feature amount, an average of the feature amounts of the plurality of frames preceding the current frame.

In a case where the microphone ID determination unit 104 determines that the room in which the microphone 2 that has collected the sound data is installed is the first room, and the presence-in-room determination unit 106 determines that the user is not present in the room in which the microphone 2 that has collected the sound data is installed, the noise feature amount calculation unit 203 stores the calculated noise feature amount in the noise feature amount storage unit 108. On the other hand, when the microphone ID determination unit 104 determines that the room in which the microphone 2 that has collected the sound data is installed is the second room, the noise feature amount calculation unit 203 outputs the calculated noise feature amount to the noise suppression unit 109.

When the user is present in a room (space) in which the microphone 2 is installed, the noise suppression unit 109 subtracts the noise feature amount stored in the noise feature amount storage unit 108 from the feature amount calculated by the feature amount calculation unit 102 to extract an action sound feature amount indicating a feature amount of an action sound generated by an action of the user.

Here, in a case where the microphone ID determination unit 104 determines that the room in which the microphone 2 that has collected the sound data is installed is the first room, and the presence-in-room determination unit 106 determines that the user is present in the room in which the microphone 2 that has collected the sound data is installed, the noise suppression unit 109 subtracts the noise feature amount stored in the noise feature amount storage unit 108 from the feature amount of the current frame calculated by the feature amount calculation unit 102.

Furthermore, in a case where the microphone ID determination unit 104 determines that the room in which the microphone 2 that has collected the sound data is installed is the second room, the noise suppression unit 109 subtracts the noise feature amount calculated by the noise characteristic calculation unit 107 from the feature amount of the current frame calculated by the feature amount calculation unit 102 to extract an action sound feature amount.

Here, an action sound will be described. The action sound is a sound generated by a user's voluntary action. The action sound does not include a voice uttered by a user. Action sounds in a bathroom and a washroom are, for example, a shower sound, a tooth brushing sound, a hand washing sound, a dryer sound, and the like. An action sound in a kitchen is, for example, a hand washing sound. An action sound in a bedroom is, for example, a door opening/closing sound. Action sounds in a corridor are, for example, a walking sound, a door opening/closing sound, and the like.

The action identification unit 110 identifies the user's action using an action sound feature amount extracted by the noise suppression unit 109. The action identification unit 110 inputs the action sound feature amount to an identification model to acquire an action label output from the identification model. The identification model is stored in advance in the memory (not illustrated). For example, when an action sound feature amount indicating a sound of shower is input to the identification model, an action label indicating that the user is taking a shower is output from the identification model.

Note that the identification model may be generated by machine learning. Examples of the machine learning include supervised learning in which a relationship between an input and an output is learned using teacher data with a label (output information) applied to input information, unsupervised learning in which a structure of data is constructed only from an unlabeled input, semi-supervised learning in which both labeled input and unlabeled input are handled, and reinforcement learning in which an action that maximizes reward is learned by trial and error. Furthermore, as a specific method of machine learning, there are provided a neural network (including deep learning using a multilayer neural network), genetic programming, a decision tree, a Bayesian network, a support vector machine (SVM), and the like. In the machine learning of the present disclosure, any of the specific examples described above may be used.

The identification model may be learnt using only a feature amount of an action sound not including noise, or may be learnt using a feature amount of an action sound to which noise is added.

The action label output unit 111 outputs an identification result of a user's action obtained by the action identification unit 110. At this time, the action label output unit 111 outputs an action label indicating the identified user's action.

FIG. 4 is a diagram for explaining a noise suppression method in the present embodiment.

The table illustrated in FIG. 4 represents a relationship among an installation location of the microphone 2, an action sound generated at the installation location, noise generated at the installation location, a consecutive frame number according to the installation location, and a noise suppression method.

In a bathroom or a washroom, action sounds are, for example, a shower sound, a tooth brushing sound, a hand washing sound, a dryer sound, or the like, and noise is a ventilation fan sound or the like. When the microphone ID of the microphone 2 installed in the bathroom or the washroom is acquired, noise is suppressed by the first noise suppression method. In the first noise suppression method, in a case where the presence-in-room determination unit 106 determines that the user is absent in the bathroom or the washroom, the noise feature amount calculation unit 203 calculates an average of feature amounts of the respective frames in the first consecutive frame number, and stores the calculated average feature amount as a noise feature amount in the noise feature amount storage unit 108. Furthermore, in the first noise suppression method, in a case where the presence-in-room determination unit 106 determines that the user is present in the bathroom or the washroom, the noise suppression unit 109 subtracts the noise feature amount stored in the noise feature amount storage unit 108 from the feature amount of the current frame. As a result, only the action sound is extracted.

In a kitchen, an action sound is, for example, a hand washing sound or the like, and noise is a sound of a ventilation fan or the like. In a case where the microphone ID of the microphone 2 installed in the kitchen is acquired, noise is suppressed by the first noise suppression method.

Furthermore, in a bedroom, an action sound is, for example, a door opening/closing sound or the like, and noise is outdoor noise, a sound of a television, or the like. In a case where the microphone ID of the microphone 2 installed in the bedroom is acquired, noise is suppressed by the first noise suppression method. In the first noise suppression method, in a case where the presence-in-room determination unit 106 determines that the user is absent in the bedroom, the noise feature amount calculation unit 203 calculates an average of feature amounts of the respective frames in the second consecutive frame number smaller than the first consecutive frame number, and stores the calculated average feature amount as a noise feature amount in the noise feature amount storage unit 108.

Note that the sound of a television is a sound generated when the user turns on the power of the television. Therefore, the sound of the television may be classified not as noise but as action sound.

In addition, in a corridor, an action sound is, for example, a walking sound, a door opening/closing sound, or the like, and noise is an echoing sound or the like. In a case where the microphone ID of the microphone 2 installed in the corridor is acquired, noise is suppressed by the second noise suppression method. In the second noise suppression method, the noise feature amount calculation unit 203 calculates an average of feature amounts of the respective frames in the second consecutive frame number preceding the current frame, and outputs the calculated average feature amount to the noise suppression unit 109 as a noise feature amount. The noise suppression unit 109 subtracts the noise feature amount calculated by the noise feature amount calculation unit 203 from the feature amount of the current frame. As a result, only the action sound is extracted.

Next, action identification processing according to the present embodiment will be described with reference to FIG. 5 and FIG. 6.

Figure 5:
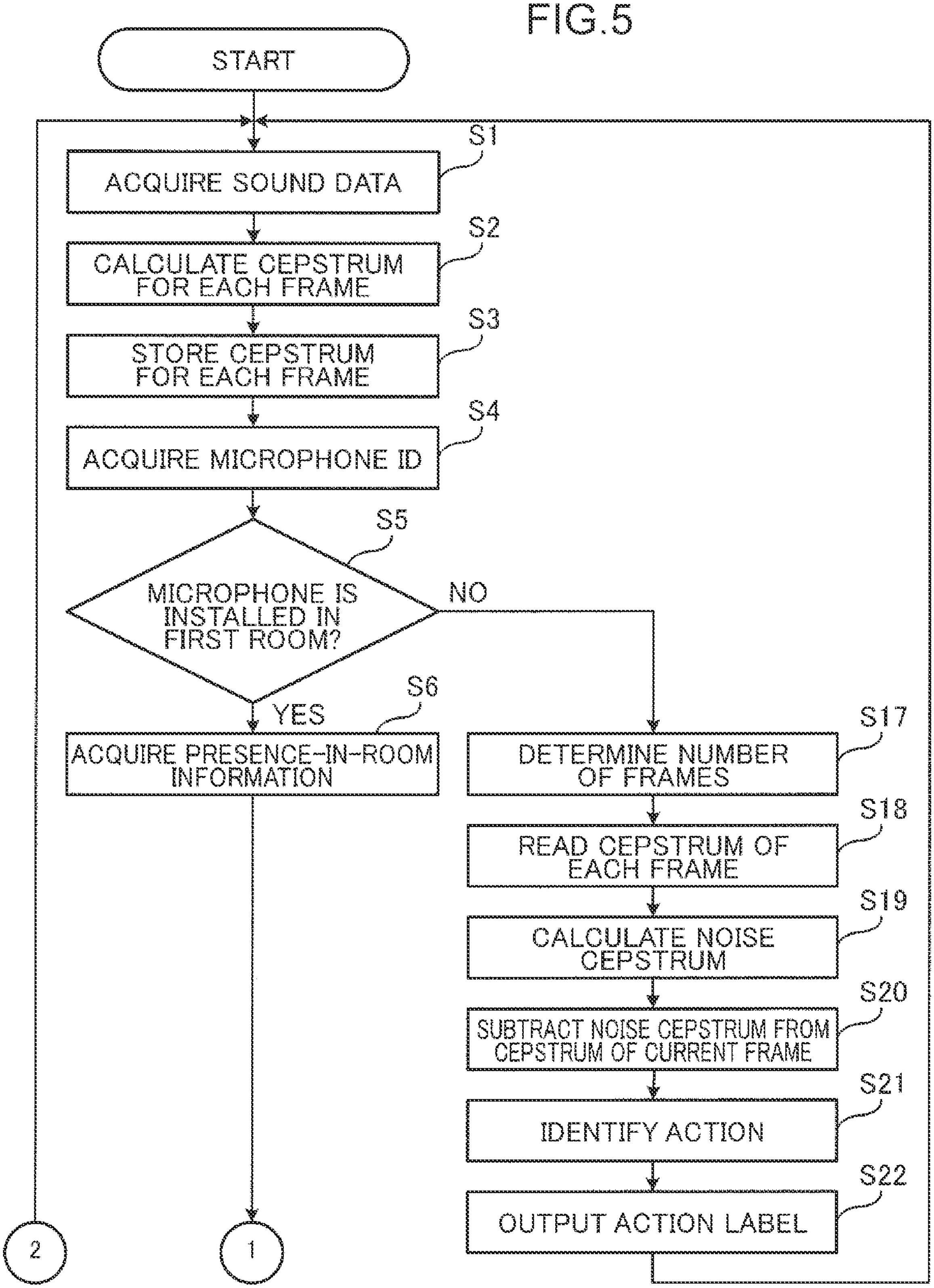
FIG. 5 is a first flowchart for explaining action identification processing in the present embodiment.
Figure 6:
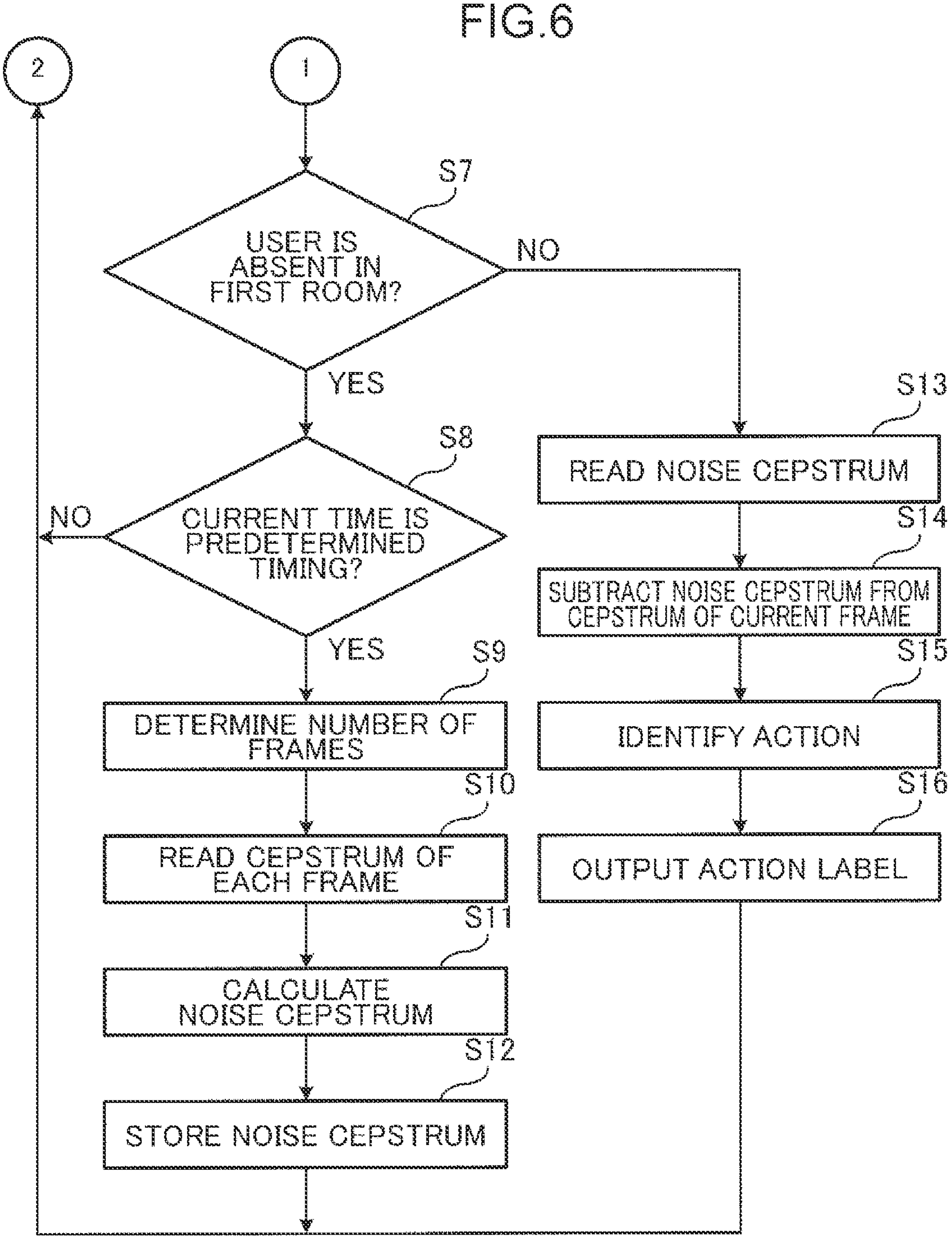
FIG. 6 is a second flowchart for explaining the action identification processing in the present embodiment.

FIG. 5 is a first flowchart for explaining the action identification processing in the present embodiment, and FIG. 6 is a second flowchart for explaining the action identification processing in the present embodiment. In the following description of the flowcharts, a cepstrum is used as a feature amount.

First, in Step S1, the sound data acquisition unit 101 acquires sound data from the microphone 2.

Next, in Step S2, the feature amount calculation unit 102 divides the sound data into frames on a fixed section basis, and calculates a cepstrum for each frame.

Next, in Step S3, the feature amount calculation unit 102 stores the calculated cepstrum for each frame in the past frame feature amount storage unit 201.

Next, in Step S4, the microphone ID acquisition unit 103 acquires the microphone ID from the microphone 2.

Next, in Step S5, the microphone 1D determination unit 104 determines whether or not the microphone 2 is installed in the first room based on the acquired microphone ID. The first room is a room in which noise other than an echoing sound exists, and is, for example, a bathroom, a washroom, a toilet, a kitchen, a bedroom, and a living room.

Here, in a case where it is determined that the microphone 2 is installed in the first room (YES in Step S5), in Step S6, the presence-in-room information acquisition unit 105 acquires, from the human sensor 3, presence-in-mom information indicating whether or not the user is present in the first room in which the microphone 2 is installed. Note that the presence-in-room information acquisition unit 105 may acquire presence-in-room information transmitted at the same timing as the sound data from the human sensor 3, or may transmit a request signal for requesting presence-in-room information to the human sensor 3 and acquire presence-in-room information transmitted in response to the request signal.

Next, in Step S7, the presence-in-room determination unit 106 determines whether or not the user is absent in the first room.

Here, in a case where it is determined that the user is absent in the first room (YES in Step S7), in Step S8, the presence-in-room determination unit 106 determines whether or not the current time point is predetermined timing. The predetermined timing is, for example, a time point when a predetermined time has elapsed from a time point at which the previous noise cepstrum is stored in the noise feature amount storage unit 108. The predetermined time is, for example, one hour.

Here, in a case where it is determined that the current time point is not the predetermined timing (NO in Step S8), the processing returns to Step S1.

On the other hand, in a case where it is determined that the current time point is the predetermined timing (YES in Step S8), in Step S9, the consecutive frame number determination unit 202 determines the number of frames based on the microphone ID. At this time, in a case where the microphone ID is a microphone ID of the microphone 2 installed in a room where stationary noise exists as noise, the consecutive frame number determination unit 202 determines the number of frames to be the first consecutive frame number. On the other hand, in a case where the microphone ID is a microphone ID of the microphone 2 installed in a room where nonstationary noise exists as noise, the consecutive frame number determination unit 202 determines the number of frames to be the second consecutive frame number smaller than the first consecutive frame number.

Next, in Step S10, the noise feature amount calculation unit 203 reads the cepstrum of each of the plurality of consecutive frames in the number determined by the consecutive frame number determination unit 202 from the past frame feature amount storage unit 201.

Next, in Step S11, the noise feature amount calculation unit 203 calculates an average of the cepstrums of the plurality of consecutive frames read from the past frame feature amount storage unit 201 as a noise cepstrum.

Next, in Step S12, the noise feature amount calculation unit 203 stores the calculated noise cepstrum in the noise feature amount storage unit 108. Then, after the processing of Step S12 is performed, the processing returns to step S1.

On the other hand, in a case where it is determined that the user is present in the first room (NO in Step S7), the noise suppression unit 109 reads the noise cepstrum stored in the noise feature amount storage unit 108 in Step S13.

Next, in Step S14, the noise suppression unit 109 subtracts the noise cepstrum read from the noise feature amount storage unit 108 from the cepstrum of the current frame calculated by the feature amount calculation unit 102. As a result, the noise suppression unit 109 extracts an action sound cepstrum indicating the cepstrum of the action sound.

Next, in Step S15, the action identification unit 110 identifies a user's action using the action sound cepstrum extracted by the noise suppression unit 109.

Next, in Step S16, the action identification unit 110 outputs an action label indicating the user's action which is the identification result. Then, after the processing of Step S16 is performed, the processing returns to Step S1. Note that the action label is preferably output together with the microphone ID or information indicating a room specified by the microphone ID. This makes it possible to specify an action performed by the user and a room in which the user has performed the action.

On the other hand, in a case where it is determined that the microphone 2 is not installed in the first room, i.e., in a case where it is determined that the microphone 2 is installed in the second room (NO in Step S5), in Step S17, the consecutive frame number determination unit 202 determines the number of frames based on the microphone ID. At this time, in a case where the microphone ID is a microphone ID of the microphone 2 installed in a room where stationary noise exists as noise, the consecutive frame number determination unit 202 determines the number of frames to be the first consecutive frame number. On the other hand, in a case where the microphone ID is a microphone ID of the microphone 2 installed in a room where nonstationary noise exists as noise, the consecutive frame number determination unit 202 determines the number of frames to be the second consecutive frame number smaller than the first consecutive frame number.

Next, in Step S18, the noise feature amount calculation unit 203 reads, from the past frame feature amount storage unit 201, the cepstrum of each of the plurality of consecutive frames preceding the current frame as many as the number determined by the consecutive frame number determination unit 202.

Next, in Step S19, the noise feature amount calculation unit 203 calculates an average of the cepstrums of the plurality of consecutive frames read from the past frame feature amount storage unit 201 as a noise cepstrum. The noise feature amount calculation unit 203 outputs the calculated noise cepstrum to the noise suppression unit 109.

Next, in Step S20, the noise suppression unit 109 subtracts the noise cepstrum calculated by the noise feature amount calculation unit 203 from the cepstrum of the current frame calculated by the feature amount calculation unit 102. As a result, the noise suppression unit 109 extracts an action sound cepstrum indicating the cepstrum of the action sound.

Note that the processing in Step S21 and Step S22 is the same as the processing in Step S15 and Step S16, and thus description thereof is omitted.

In a space where no user is present, only noise other than an action sound generated by an action of a user is detected. Therefore, in a case where there exists no user in a space, a noise feature amount indicating a feature amount of noise is calculated based on a feature amount of sound data acquired from the microphone 2 disposed in the space, and the calculated noise feature amount is stored in the storage unit. Then, in a case where the user is present in the space, the noise feature amount stored in the noise feature amount storage unit 108 is subtracted from the feature amount of the sound data acquired from the microphone 2 disposed in the space. As a result, it is possible to extract only the action sound feature amount indicating the feature amount of the action sound with noise suppressed in the space. Then, since the user's action is identified using the feature amount of the action sound with noise suppressed, the user's action can be identified with higher accuracy even in a space where the action sound and noise are mixed.

Furthermore, in the case where no user is present in a space, a noise feature amount indicating a feature amount of noise is stored in the noise feature amount storage unit 108. Therefore, in the case where the user is present in the space, an action sound of the user can be acquired in real time using the noise feature amount stored in the noise feature amount storage unit 108. As a result, the users action can be identified in real time.

Although in the present embodiment, a cepstrum is used as a feature amount, the present disclosure is not particularly limited thereto. The feature amount may be a Mel-filterbank log energy or a Mel-frequency cepstrum coefficient (MFCC) for each frequency band. Even if the feature amount is a Mel-filterbank log energy or a Mel-frequency cepstrum coefficient for each frequency band, noise can be suppressed and action can be identified with high accuracy as in the present embodiment.

In addition, although in the present embodiment, the action identification system includes one action identification device 1, the one action identification device 1 being disposed in a predetermined room in a residence, the present disclosure is not particularly limited thereto. The action identification system may include a plurality of action identification devices 1. The plurality of action identification devices 1 may be disposed in each room in a residence together with the microphone 2 and the human sensor 3. Each of the plurality of action identification devices 1 may identify an action of a user in each room. In addition, one action identification device 1 may be a server disposed outside a residence. In this case, the action identification device 1 is communicably connected to the microphone 2 and the human sensor 3 via a network such as the Internet.

Note that in each embodiment described above, each component may be configured by dedicated hardware or may be implemented by executing a software program suitable for each component. Each component may be implemented by reading and executing, by a program execution unit such as a CPU or a processor, a software program recorded in a recording medium such as a hard disk or a semiconductor memory.

A part or all of the functions of the device according to the embodiment of the present disclosure are realized as large scale integration (LSI) that is typically an integrated circuit. These may be individually integrated into one chip, or may be integrated into one chip so as to include a part or all of the functions. Further, the circuit integration is not limited to LSI, and may be realized by a dedicated circuit or a general-purpose processor. A field programmable gate array (FPGA) that can be programmed after manufacturing of LSI, or a reconfigurable processor in which connections and setting of circuit cells inside LSI can be reconfigured may be used.

A part or all of the function of the device according to the embodiment of the present disclosure may be implemented by execution of a program by a processor such as a CPU.

In addition, the numbers used in the foregoing are all illustrated to specifically explain the present disclosure, and the present disclosure is not limited to the illustrated numbers.

In addition, the order in which the respective steps illustrated in the above flowcharts are executed is for specifically explaining the present disclosure, and may be an order other than the above order as long as a similar effect can be obtained. In addition, a part of the above steps may be executed simultaneously (in parallel) with other steps.

INDUSTRIAL APPLICABILITY

Since the technique according to the present disclosure enables identification of a user's action with higher accuracy, it is useful for a technique of identifying a user's action.

The invention claimed is:

1. An action identification method for identifying an action of a user, the method comprising, by a computer:

acquiring sound data from a microphone;

calculating a feature amount of the sound data;

determining whether or not the user is present in a space in which the microphone is installed;

calculating a noise feature amount indicating a feature amount of noise based on the calculated feature amount and storing the calculated noise feature amount in a storage in a case where the user is not present in the space;

subtracting the noise feature amount stored in the storage from the calculated feature amount to extract an action sound feature amount indicating a feature amount of an action sound generated by an action of the user in a case where the user is present in the space; and identifying the action of the user by using the action sound feature amount, wherein in the calculation of the feature amount, the sound data is divided into frames on a fixed section basis and the feature amount is calculated for each frame, the method further comprises acquiring identification information for identifying the microphone, and in the calculation of the noise feature amount, the noise feature amount is determined based on the acquired identification information of the microphone.

2. The action identification method according to claim 1, wherein in the determining of the noise feature amount, the number of the frames is determined based on the acquired identification information of the microphone and an average of the feature amounts of a plurality of frames in the determined number of the frames is calculated as the noise feature amount.

3. The action identification method according to claim 2, wherein the number of the frames determined based on the identification information of the microphone installed in a space where stationary noise with a small time variation exists as the noise is larger than the number of the frames determined based on the identification information of the microphone installed in a space where nonstationary noise with a large time variation exists as the noise.

4. The action identification method according to claim 1, further comprising:

in a case where the identification information is predetermined identification information, calculating an average of feature amounts of a plurality of frames preceding a current frame as the noise feature amount; and subtracting the calculated noise feature amount from the calculated feature amount of the current frame to extract the action sound feature amount.

5. The action identification method according to claim 4, wherein the predetermined identification information is the identification information of the microphone installed in a space where an echoing sound exists as the noise.

6. The action identification method according to claim 1, wherein the feature amount is a cepstrum.

7. An action identification device that identifies an action of a user, the action identification device comprising:

a sound data acquisition circuit that acquires sound data from a microphone;

a feature amount calculation circuit that calculates a feature amount of the sound data;

a determination circuit that determines whether or not the user is present in a space in which the microphone is installed;

a noise calculation circuit that calculates a noise feature amount indicating a feature amount of noise based on the calculated feature amount, and stores the calculated noise feature amount in a storage in a case where the user is not present in the space;

an action sound extraction circuit that subtracts the noise feature amount stored in the storage from the calculated feature amount to extract an action sound feature amount indicating a feature amount of an action sound generated by an action of the user in a case where the user is present in the space; and an action identification circuit that identifies the action of the user by using the action sound feature amount, wherein the feature amount calculation circuit divides the sound data into frames on a fixed section basis and calculates the feature amount for each frame, the action identification device further comprises a microphone ID acquisition circuit that acquires identification information for identifying the microphone, and the noise calculation circuit determines the noise feature amount based on the acquired identification information of the microphone.

8. A non-transitory computer-readable recording medium recording an action identification program for identifying an action of a user, the action identification program causing a computer to function so as to:

acquire sound data from a microphone;

calculate a feature amount of the sound data;

determine whether or not the user is present in a space in which the microphone is installed;

calculate a noise feature amount indicating a feature amount of noise based on the calculated feature amount and store the calculated noise feature amount in a storage in a case where the user is not present in the space;

subtract the noise feature amount stored in the storage from the calculated feature amount to extract an action sound feature amount indicating a feature amount of an action sound generated by an action of the user in a case where the user is present in the space; and identify the action of the user by using the action sound feature amount, wherein in the calculation of the feature amount, the sound data is divided into frames on a fixed section basis and the feature amount is calculated for each frame, the action identification program further causes the computer to acquire identification information for identifying the microphone, and in the calculation of the noise feature amount, the noise feature amount is determined based on the acquired identification information of the microphone.

* * * * *